Sept. 23, 1969  P. P. ZAFFARONI ET AL  3,467,988
VIBRATION VENTED TIRE MOLD
Filed April 13, 1967  5 Sheets-Sheet 1
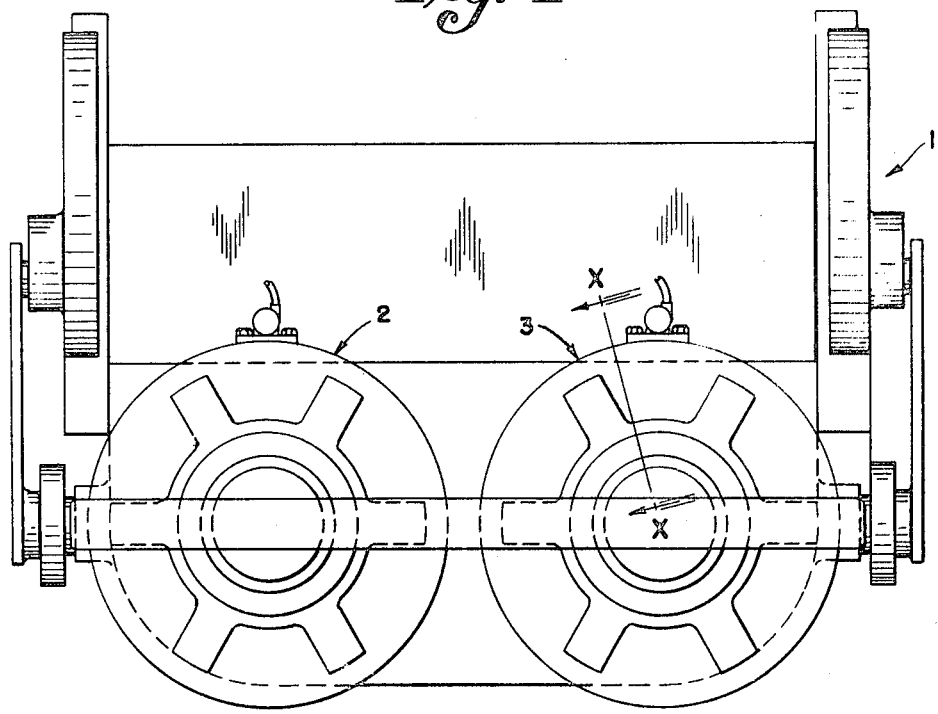
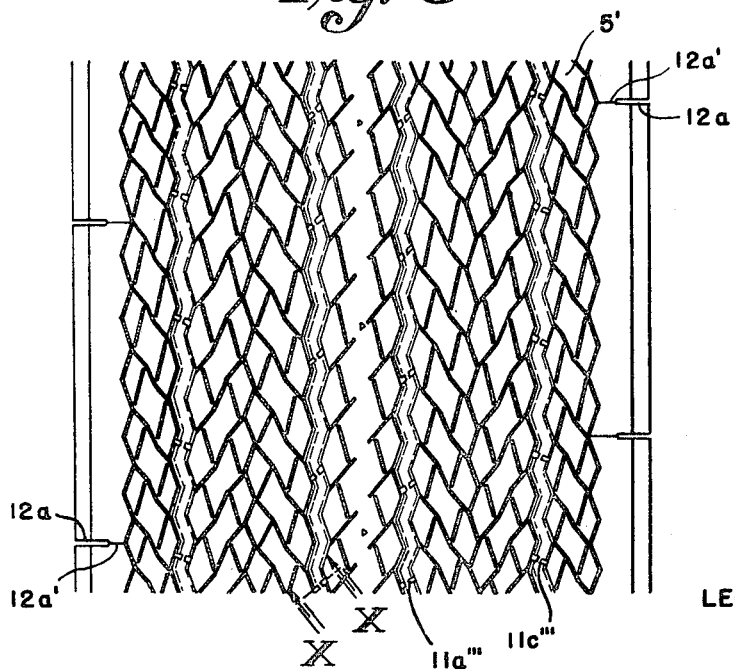
INVENTOR.
PETER P. ZAFFARONI
LEONARD C. YOUNGBLOOD
HENRY STERNBERG
ATTORNEY.

Sept. 23, 1969     P. P. ZAFFARONI ET AL     3,467,988
VIBRATION VENTED TIRE MOLD
Filed April 13, 1967
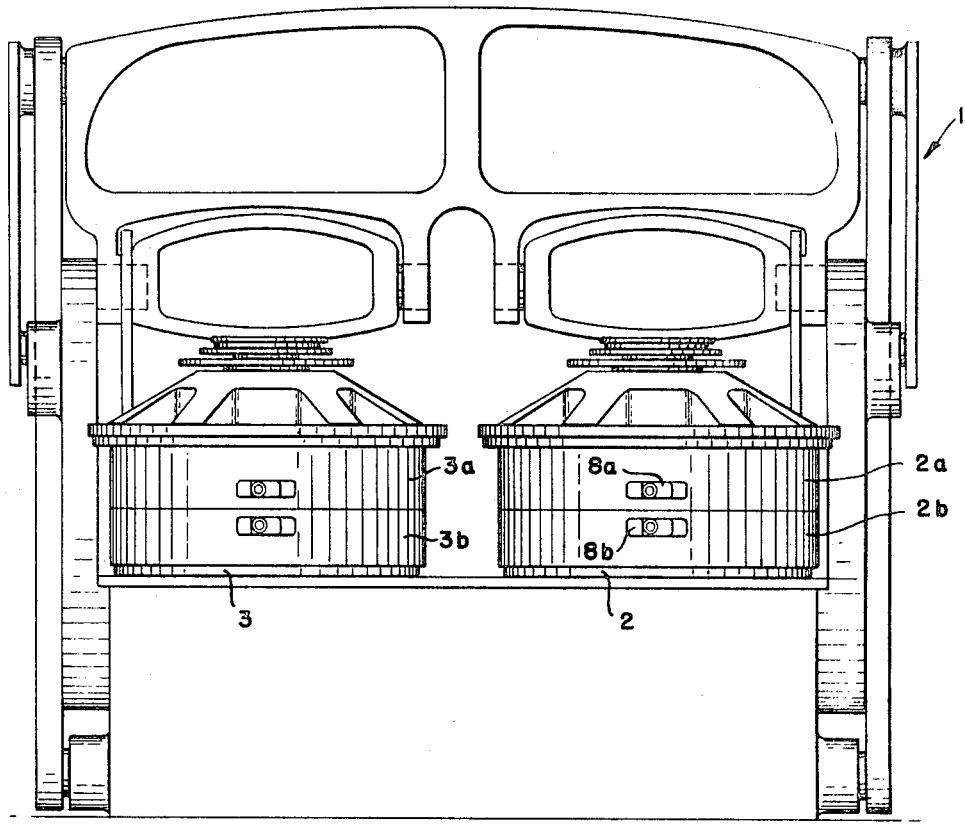
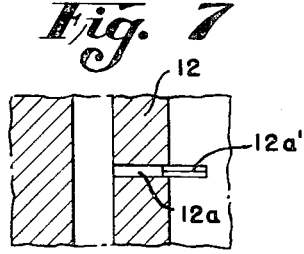
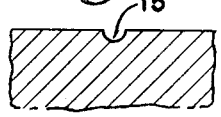
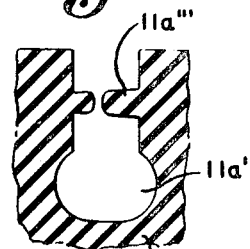
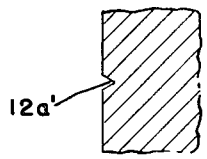
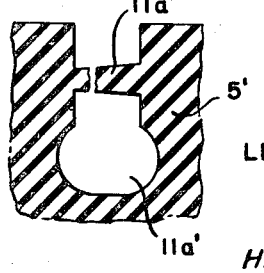
INVENTOR.
PETER P. ZAFFARONI
LEONARD C. YOUNGBLOOD
HENRY STERNBERG
ATTORNEY.

INVENTOR.
PETER P. ZAFFARONI
LEONARD C. YOUNGBLOOD

*HENRY STERNBERG*
ATTORNEY.

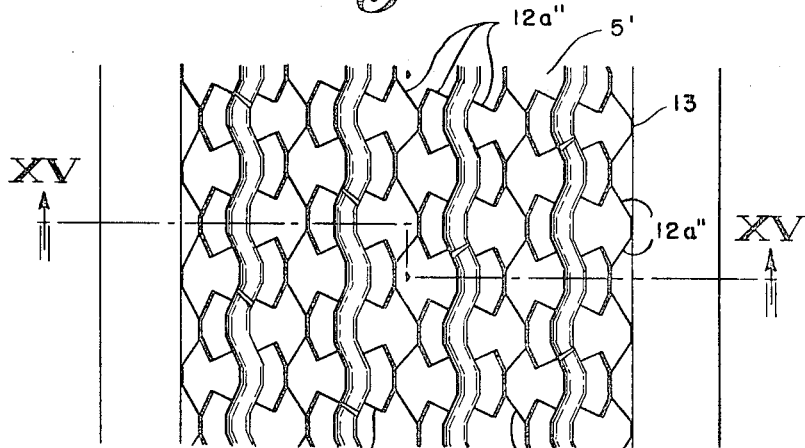
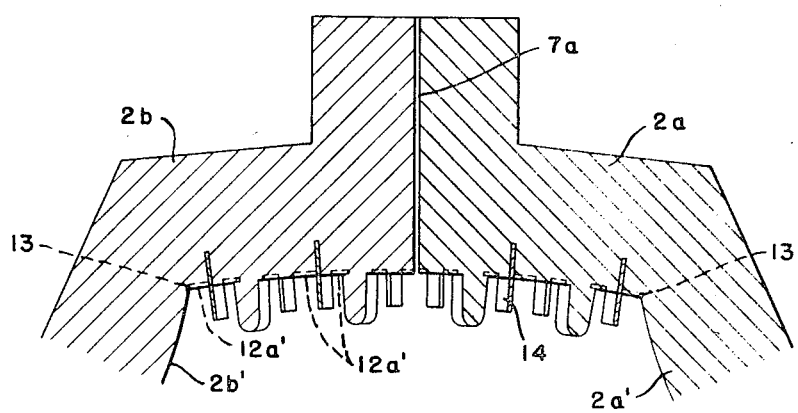
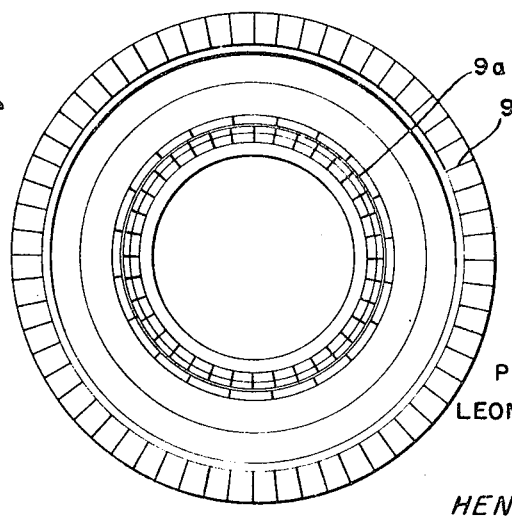

United States Patent Office 3,467,988
Patented Sept. 23, 1969

3,467,988
VIBRATION VENTED TIRE MOLD
Peter P. Zaffaroni, Detroit, and Leonard C. Youngblood, Grosse Pointe Park, Mich., assignors to Uniroyal, Inc., New York, N.Y., a corporation of New Jersey
Filed Apr. 13, 1967, Ser. No. 630,593
Int. Cl. B29h 5/02; B28b 1/08; B06b 3/00
U.S. Cl. 18—38
9 Claims

ABSTRACT OF THE DISCLOSURE

A tire vulcanizing mold whose independent, cavity-defining mold sections have vents provided at their interfaces to which air trapped between the tire and mold surfaces is led and through which such air is expelled by vibrating the mold inner and the tire outer surfaces with respect to each other during the tire shaping stage and final closing of the mold for curing of the tire therein.

---

This invention relates generally to the venting of trapped gaseous medium in tire molds. More specifically, this invention relates to the venting of trapped gaseous medium from tire molds provided with a minimum number of vent openings.

Conventionally, tire vulcanizing molds are provided with a multitude of vent holes extending through various parts thereof. The number of such vent holes may be of the order of 300 or more depending on the size and design characteristics of the tires to be molded. The tire rubber which follows expelled air into these conventional vents is called "vent rubber" and either breaks off in the vent holes during opening of the mold, or remains on the tire as unsightly, pin-shaped, protrusions extending from the tire surface.

Any vent rubber which remains in the vent holes must be removed therefrom and any vent rubber which extends from the tire surface must be trimmed, thus requiring additional operations and expense.

It is, therefore, a primary object of the present invention to provide a tire mold which will overcome the aforesaid disadvantages.

It is another object of the present invention to provide a tire mold which will not require conventional drilled vent holes which can get clogged and which will, therefore, not mold tires with unsightly vent rubber extending from the surface.

It is a further object of the present invention to provide a tire mold which allows trapped gaseous material to escape without requiring the extensive trimming operation now required on tires molded in conventional molds.

According to one form of the present invention vibrator means are operatively connected to at least one mold section of a tire mold for moving the inner mold surface of such section alternately toward and away from the adjacent outer surface of a tire positioned in the mold, whereby gaseous material trapped between the outer surface of the tire and the inner surface of the mold may be expelled from the mold cavity through air exit paths whenever the aforesaid surfaces move toward one another during the vibration cycle.

Other objects and advantages of the present invention will become apparent from the following description of the preferred form of the invention, reference being had to the accompanying drawings in which:

FIG. 1 is a top plan view of a tire vulcanizing press in accordance with the present invention;

FIG. 2 is a rear elevational view of the press according to FIG. 1, showing a pair of tire molds thereon;

FIG. 3 is a partial plan view of a tire tread formed in a mold constructed according to the present invention;

FIG. 7 is an enlarged sectional view taken on the plane indicated by the line VII—VII of FIG. 4, in the direction of the arrows;

FIG. 8 is an enlarged sectional view taken on the plane indicated by line VIII—VIII of FIG. 4, in the direction of the arrows;

FIG. 9 is an enlarged sectional view taken on the plane indicated by line IX—IX of FIG. 4, in the direction of the arrows;

FIG. 10 is an enlarged transverse sectional view through a portion of a tire taken on the plane indicated by line X—X of FIG. 3 showing a groove formed in accordance with the present invention;

FIG. 11 is an enlarged transverse sectional view through a portion of another tire similar to FIG. 10 showing a groove formed in accordance with the present invention;

FIG. 14 is a plan view of a tread portion of a tire formed according to a method of the present invention;

Figure 4:
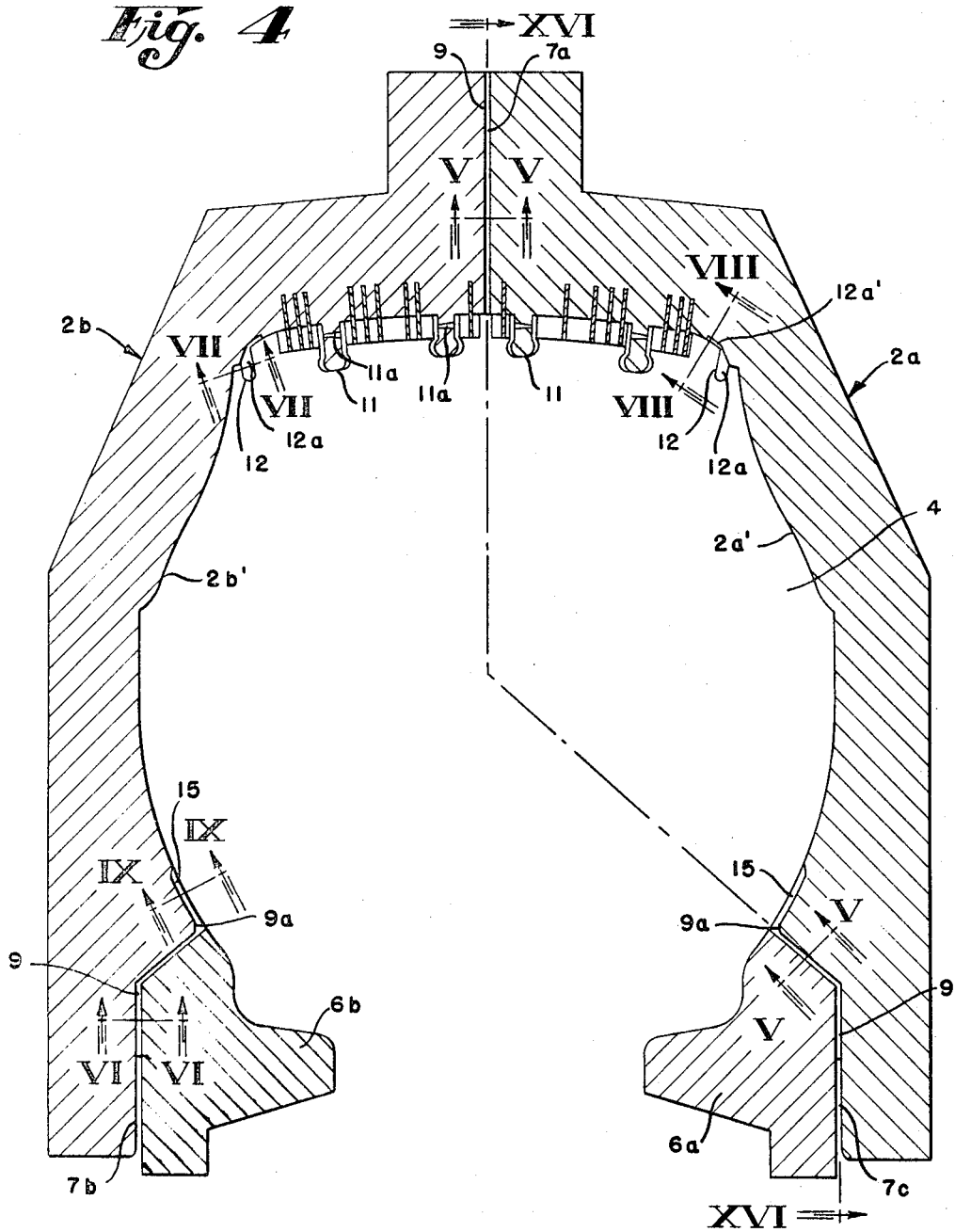
FIG. 4 is a sectional view taken along line X—X in the direction of the arrows of FIG. 1, showing the mold halves and the toe ring members in closed position of the mold.

FIG. 15 is a partial sectional elevational view of a portion of the mold used in fabricating the tire illustrated in FIG. 14 with the view taken on the plane of the mold which would correspond to the plane indicated generally by line XV—XV of FIG. 14, in the direction of the arrows; and FIG. 16 is a plan view of a mold half, on a reduced scale, taken on the plane indicated by line XVI—XVI of FIG. 4, in the direction of the arrows, and showing a venting arrangement according to the present invention.

Figure 12:
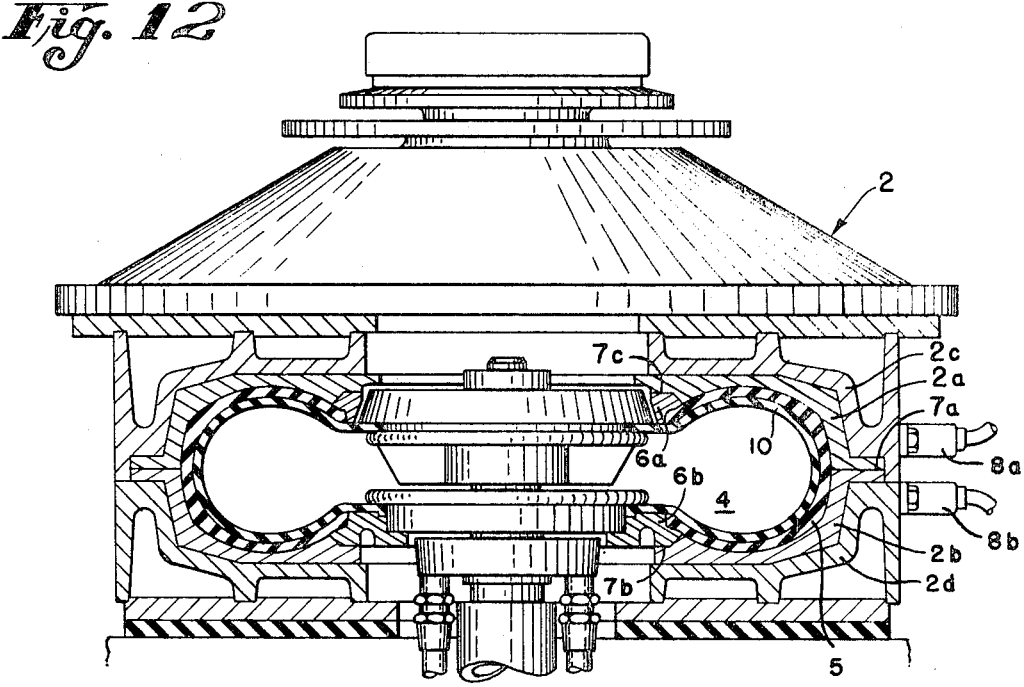
FIG. 12 is a transverse sectional elevation of a tire mold press for practicing the present invention.
Figure 13:
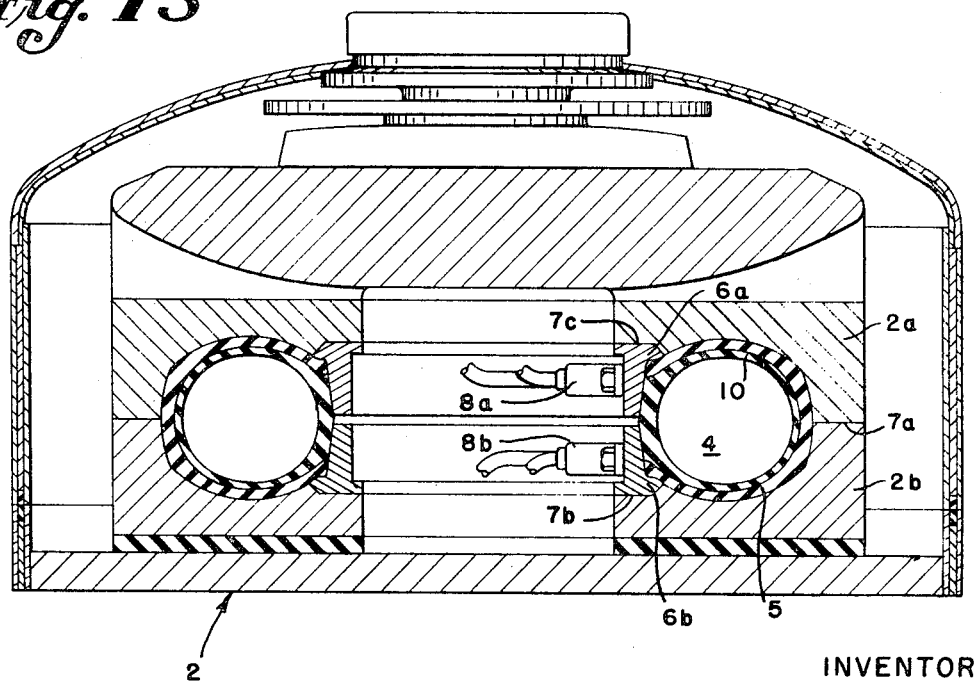
FIG. 13 is a view similar to that illustrated in FIG. 12, illustrating a modified version of the mold press for practicing the present invention.

Turning now to the drawings and first to FIGS. 1 and 2, the conventional curing press 1 has a pair of vulcanizing molds 2 and 3 having separable mold sections 2a, 2b and 3a, 3b respectively. The mold sections 2a, 2b have inner mold surfaces 2a', 2b' which define between themselves a space 4, as seen in FIG. 4, adapted to receive a tire carcass to be formed into a tire 5, as illustrated in FIGS. 12 and 13.

Each of the vulcanizing molds further includes conventional toe-ring members 6a and 6b for engaging the bead portion of the tire in the conventional manner. The upper and lower mold sections 2a and 2b, respectively, are relatively movable axially in the conventional manner with respect not only to each other but also the lower mold section 2b is movable with respect to the toe ring member 6b while upper toe ring member 6a moves with mold section 2a, said sections and toe ring members forming between themselves interfaces 7a, 7b and 7c, seen in FIG. 4.

According to the present invention, each of the vulcanizing molds, 2 and 3, comprises a vibrating means which preferably takes the form of a pair of vibrators 8a and 8b mounted, respectively, on e.g., mold steam-back sections 2c and 2d which, in turn, are fixed to mold sections 2a and 2b, respectively. The vibrators are securely fixed to the respective mold steam-back sections so as to impart to the respective mold sections 2a, 2b a vibratory movement whenever the vibrators are activated. As shown in FIGS. 1, 2 and 12, the vibrators 8a and 8b may be securely fixed to an exterior peripheral surface of mold steam-back sections 2c and 2d and preferably arranged to impart to the respective mold sections 2a and 2b an oscillatory movement substantially in a plane normal to the vertical axis of the mold. While the indicated mounting of the vibrators is preferred, it will be noted, of course, that the vibrators may be mounted at other convenient locations without departing from the spirit of the invention. Thus, for example, the vibrators 8a and 8b may be mounted, instead, on other separable mold members such as the toe ring members 6a and 6b, respectively, as shown, for example, in FIG. 13. For certain mold constructions a single vibrator may suffice. Those skilled in the art, will also be readily able to apply ultrasonic or electromagnetic vibrators which are not mechanically connected to the mold but rather are only coupled thereto via sound waves and electromagnetic waves, respectively.

Figure 6:
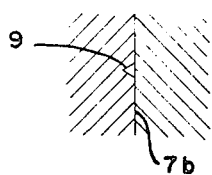
FIG. 6 is another enlarged sectional view taken on the plane indicated by line VI—VI of FIG. 4, in the direction of the arrows.
Figure 5:
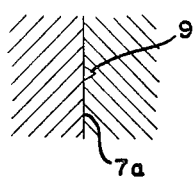
FIG. 5 is an enlarged sectional view taken on the plane indicated by line V—V of FIG. 4, in the direction of the arrows.

According to the present invention, the mold is provided with venting means which provide escape paths for gaseous material trapped between the tire and the inner mold surfaces when the mold is in the shaping stages and during final closing, i.e., when the mold sections 2a, 2b, 6a and 6b approach and are in the position illustrated in FIG. 4. The venting means according to the present invention are located exclusively in the region of the existing interfaces 7a, 7b and 7c between the respective mold sections. These venting means preferably take the form of grooves 9 (hereinafter referred to as "interface scratch vents") cut in the surface of one of the mold sections at its interface with another of said mold sections. Thus, as seen in FIGS. 4, 5, 6 and 16, interface scratch vents 9 are provided in the interface surfaces of the respective mold sections. These scratch vents 9 extend radially and are distributed circumferentially over the respective surfaces at interfaces 7a, 7b and 7c. Preferably, these interface scratch vents are provided at each interface, circumferentially spaced approximately ¼" apart, or of sufficient number to adequately exhaust the trapped gases. These interface scratch vents are preferably V-shaped, as seen in FIGS. 5 and 6, and are preferably approximately .020 to .030 inches deep having a central angle of approximately 60°. The innermost portions of the radial interface scratch vents communicates with the interior of the cavity 4, while the opposite end of each interface scratch vent communicates preferably with the atmosphere.

Additional, preferably circumferentially extending vents 9a, are provided at the inner mold surface junction of the mold sections 2a and 2b with the toe rings 6a and 6b, respectively. The interface scratch vents 9, in this region, communicate with and are at substantially right angles to the circumferential vents 9a.

Scratch vents 9 and circumferential vents 9a, it will be seen, facilitate the escape of gaseous material trapped between the outer surface of a tire 5 and portions of the inner mold surfaces 2a' and 2b' during shaping and mold closing stages and during the final molding and curing process.

When the mold is closed a partially formed, raw tire 5, located in the cavity 4, is pressed, by way of a conventional curing bag 10 having internal pressure applied thereto, against the sidewall and the tread forming portions of the inner mold surface 2a' and 2b'. When portions of the tire 5 are thusly pressed against tread groove forming projections 11, it is possible that air trapped in compartments formed by such projections, the outer tire surface, and the inner mold surfaces, will not be able to reach the scratch vents 9, 9a previously described, unless additional lateral internal passages are provided. According to the present invention, therefore, passages 11a (hereinafter referred to as Across Tread Lateral vents, or ATL vents) are bored laterally through the circumferentially extending ribs 11, to provide lateral air passages therethrough, for permitting air trapped in spaced regions of the tire mold to escape to the region of the parting line, i.e., interface 7a. It being understood that the design forming elements 14 are provided with conventional air passages (not shown) therethrough as practiced by those skilled in the art. When molding pressure is applied in the conventional manner via the bag 10, some of the tire rubber will inevitably flow into the ATL vents 11a. FIG. 11 shows ATL filling vent rubber 11a" broken upon removal of the tire from the mold, while FIG. 10 shows vent rubber 11a''', which did not entirely fill the ATL vent, extending from both sides of the tread groove toward the middle.

FIG. 3 shows a portion of a tire tread cured in a mold according to the present invention with the ATL vent rubbers 11a''' in the circumferentially extending groove portions of the tread.

In order to facilitate the escape of the gaseous material also from the sidewall regions of the tire, additional passageways are preferably provided. Thus, for the same reasons as described above in connection with the ATL vents, axial slots 12a are provided through the circumferentially extending shoulder-groove-forming-projections 12. Cooperating with these axial slots 12a, are provided a plurality of circumferentially distributed axially extending, interior scratch vents 12a', illustrated in FIGS. 4, 7 and 8. These slots and scratch vents all facilitate passage of otherwise trapped air from the sidewall regions of the mold toward the parting line interface 7a. In the tread design for a large size tire as illustrated, for example, in FIG. 14, the tread marks 12a" which correspond to scratch vents 12a, are shown. It is seen that vents 12a' provide air passages, see FIG. 15, laterally through the entire tread patterns, connecting the insert configuration 14 to the circumferentially extending shoulder grooves 13 and also to the mold parting line at interface 7a. It is to be understood that vents 12a' are not necessary in all cases but are preferred for molding of tires having certain design, size or shape characteristics which prevent adequate lateral flow of gas, e.g., with heavy-duty, wide-ribbed tires having large spans of tread surface between the insert regions and the grooves.

Additionally, for further facilitating the flow of trapped air within the mold cavity, there may be provided a plurality of radially extending sidewall flutes 15, distributed circumferentially along the inner mold surfaces 2a' and 2b', respectively, adjacent the corresponding toe ring 6a, 6b. As seen in FIG. 4, these flutes 15 communicate directly with circumferentially extending vents 9a.

It is generally desirable to taper the ATL vents so that they have a smaller diameter end for the purpose of providing a relatively weaker section for the molded ATL vent-rubber to break at the adjoining tread rib. It will be noted that the ATL vents 11a act not only as air channels for directing the flow of air in desired directions but may also act as air reservoirs for any residual air which cannot otherwise escape.

According to the present invention, the mold sections are vibrated at a relatively high frequency and at a relatively low amplitude. The mold is preferably vibrated during the shaping stages of closing and throughout the remaining closing cycle. Because the elastomeric raw tire carcass in the mold, is unable to respond to the vibrations in the same manner as the mold structure itself, there results a relative difference in movement between tire outer surface portions and corresponding mold inner surface portions. Thus, the vibrating mold sections have portions which move alternately toward and way from corresponding adjacent outer surface portions of a tire 5 positioned in the cavity 4. The rapid, successive, movements of adjacent surfaces toward and away from each other act, during that part of each cycle when adjacent surface portions are spaced from each other, to permit air to move through the space created thereby, and during that part of each cycle when the surfaces move toward each other, to expel such air into the next adjacent space and eventually out through the interface scratch vents located in the interface regions. Vibrations having an amplitude in the range of .0005 to .050 inch have been found quite satisfactory in producing the above described results.

Vibrators of the following description have been used successfully in practicing the present invention with tire molds for conventional passenger car tires:

No. CD 35, Vibrolators (registered trademark) manufactured by the Martin Engineering Company, Neponset, Ill. The preferred frequency range of vibration is approximately 5,000 cycles per minute while successful operation has been accomplished with frequencies in the range of 2,000 through 10,000 cycles per minute. Other conventional vibrating devices may, of course, be used instead of the above described devices. The latter work on the principle of a ball-weight spun around and around, inside an outer race, by compressed air or steam, so as to generate powerful, high-frequency, all directional (substantially in one plane) vibrations. The preferred mounting is such that the circling ball moves substantially in a plane normal to the axis of the tire mold.

The particular type of vibrator described herein does not form a part of this invention. Those skilled in the art will be aware of many different readily available vibrating devices which will accomplish the stated purposes, Thus, it is necessary only that the vibrating mechanism used, vibrates either the mold with respect to the tire located therein or the wire with respect to the mold surrounding it, in such a manner as to result in a vibration response of the tire with respect to the mold which is either of a different phase, a different amplitude, a different frequency, or all three of the latter. It being important only that a relative movement in successively alternate directions is produced between corresponding adjacent surface portions of the tire and the mold surface, so as to provide paths for air movement, on the one hand, and to excel such air, on the other hand. It will be obvious to those skilled in the art that the vibration response of the heavy, generally rigid mold structure will be, particularly at relatively high frequencies, substantially different from the response of the elastomeric tire material located therein.

As used herein, the term "vibration" is intended to include also oscillatory movement.

According to the method of the present invention a partially formed, raw tire is placed into the mold cavity 4 in the conventional manner. The mold is closed in the conventional manner and also as is conventional, pressure is applied to the interior of the tire, expanding the latter outwardly against the sidewall and tread forming portions of the fold surfaces 2a' and 2b'. In the shaping stage during the closing of the mold sections, with the tire therebetween, and during the final closing for molding of the tire outer surface, as described, vibrator means 8a and 8b are activated and vibrate the mold sections with respect to the tire located therebetween, relatively moving outer surface portions of the tire and corresponding adjacent inner surface portions of the mold member toward and away from each other in rapid succession whereby gaseous material trapped between such surface portions can escape toward the interface regions 7a, 7b and 7c and there be expelled or escape to the atmosphere.

An additional advantage derived from the apparatus according to the present invention is the capability of facilitating removal of the finished tire from the mold by again vibrating the mold with respect to the tire so as to essentially vibrate the tire out of the mold while the mold is being opened.

While there has been described what is at present considered to be the preferred embodiment of this invention, it will be obvious to those skilled in the art that various changes and modifications may be made therein without departing from the invention, and it is therefore, intended to cover all such changes and modifications as fall within the true spirit and scope of the invention.

Having thus described our invention, what we claim and desire to protect by Letters Patent is:

1. In a vulcanizing mold for tires comprising a plurality of cooperating mold sections having interfaces therebetween and said mold sections having mold surfaces defining between themselves a space adapted to receive a partly formed tire;
   venting means communicating with said space for providing an escape path for gaseous material trapped therein;
   and vibrator means operatively connected to at least one of said mold sections for moving portions of said inner mold surface of the latter alternately toward and away from adjacent outer surface portions of a tire positioned in said space, whereby gaseous material trapped between the outer surface of said tire and said mold surface is expelled into said vent means whenever said last mentioned surfaces move toward one another.

2. A mold according to claim 1, wherein said venting means are located solely in the region of said interfaces of said mold sections.

3. A mold according to claim 2, comprising an inner tread forming portion and further comprising interior passage means located in said tread forming portion for permitting gaseous material trapped in one region of said cavity to escape to another region thereof.

4. A mold according to claim 1, wherein said vibrator means comprises a high-frequency, low-amplitude, vibrator.

5. A mold according to claim 1, further comprising resilient means supporting said one mold section for vibration.

6. A mold according to claim 1, wherein said mold sections comprise an upper and a lower mold section defining between themselves a generally toroidally shaped space for receiving a partly formed tire, at least a portion of said venting means being located at the interface between said upper and lower mold sections.

7. A mold according to claim 6, wherein said mold sections comprise a pair of toe-ring sections located centrally with respect to said upper and lower sections and respectively defining interfaces with said upper and lower mold sections, when the mold is closed, said venting means being located entirely in the regions of all of said interfaces.

8. A mold according to claim 7, wherein said vibrator means is operatively connected to said central toe-ring section.

9. A mold according to claim 7, wherein said vibrator means comprises a pair of vibrator mechanisms operatively connected, respectively, to said upper and lower mold sections for vibrating the latter.

References Cited

UNITED STATES PATENTS

| | | | |
|---|---|---|---|
| 1,380,085 | 5/1921 | Walton | 18—38 |
| 2,738,406 | 3/1956 | Zaleski | 18—38 X |
| 2,756,460 | 7/1956 | Heintz. | |
| 2,779,386 | 1/1957 | Waters. | |
| 2,803,043 | 8/1957 | Stephens. | |
| 3,298,065 | 1/1967 | Pendleton | 18—34 X |

FOREIGN PATENTS

| | | |
|---|---|---|
| 1,089,960 | 9/1960 | Germany. |
| 1,016,124 | 1/1966 | Great Britain. |

J. HOWARD FLINT, Jr., Primary Examiner

U.S. Cl. X.R.

25—41; 264—23, 71

UNITED STATES PATENT OFFICE
CERTIFICATE OF CORRECTION

Patent No. 3,467,988        Dated September 23, 1969

Inventor(s) Peter P. Zaffaroni and Leonard C. Youngblood

It is certified that error appears in the above-identified patent and that said Letters Patent are hereby corrected as shown below:

Column 6, line 8, after "having" insert --inner--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents